United States Patent
Vos et al.

(10) Patent No.: US 9,948,789 B2
(45) Date of Patent: Apr. 17, 2018

(54) METHOD AND SYSTEM FOR PROVIDING DIFFERENTIATED WIRELESS NETWORK ACCESS AND BILLING TO SUBSCRIBERS

(71) Applicant: SIERRA WIRELESS, INC., Richmond (CA)

(72) Inventors: Gustav Gerald Vos, Surrey (CA); Richard Thomas Kavanaugh, Encinitas, CA (US); Steven John Bennett, Coquitlam (CA)

(73) Assignee: Sierra Wireless, Inc., Richmond (CA)

( * ) Notice: Subject to any disclaimer, the term of this patent is extended or adjusted under 35 U.S.C. 154(b) by 0 days.

(21) Appl. No.: 14/243,604

(22) Filed: Apr. 2, 2014

(65) Prior Publication Data
US 2014/0295790 A1    Oct. 2, 2014

Related U.S. Application Data

(60) Provisional application No. 61/807,690, filed on Apr. 2, 2013.

(51) Int. Cl.
*H04M 15/00* (2006.01)
*H04W 4/24* (2018.01)

(52) U.S. Cl.
CPC .......... *H04M 15/60* (2013.01); *H04M 15/58* (2013.01); *H04M 15/80* (2013.01);
(Continued)

(58) Field of Classification Search
CPC ......... H04M 15/8033; H04M 15/8038; H04M 15/60; H04M 15/8027; H04M 15/81;
(Continued)

(56) References Cited

U.S. PATENT DOCUMENTS 6,785,550 B1 *  8/2004  Bi et al. ............... 455/456.1
8,179,783 B2    5/2012  Cheng et al.
(Continued)

FOREIGN PATENT DOCUMENTS

EP    2439875    4/2012
EP    2989814    3/2016
(Continued)

OTHER PUBLICATIONS

Updated SID on: Provision of low-cost MTC UEs based on LTE (TSG RAN meeting #57, Chicago, USA, Sep. 2012, RP-121441), Available at http://www.3gpp.org/ftp/tsg_ran/TSG_RAN/TSGR_57/Docs/RP-121441.zip. 6 pages.
(Continued)

*Primary Examiner* — Nathan Mitchell
(74) *Attorney, Agent, or Firm* — Perkins Coie LLP

(57) ABSTRACT

The present technology provides a method and system for monetizing the usage of a certain "reserved service," which comprises usage of certain reserved wireless operating modes, such as Ultra High Coverage Mode (UHCM), usage of one or more reserved Modulation and Coding Schemes (MCSs), or a combination thereof. In some embodiments the reserved MCSs may be employed solely when using the reserved operating mode. Similarly, the reserved operating mode may be defined at least in part by its usage of the reserved MCSs.

23 Claims, 4 Drawing Sheets

(52) U.S. Cl.
CPC ... *H04M 15/8016* (2013.01); *H04M 15/8027* (2013.01); *H04M 15/81* (2013.01); *H04W 4/24* (2013.01)

(58) Field of Classification Search
CPC .. H04M 15/80; H04M 15/58; H04M 15/8016; H04W 4/24
USPC .................................................. 455/406–408
See application file for complete search history.

(56) References Cited

U.S. PATENT DOCUMENTS

| | | | | |
|---|---|---|---|---|
| 8,750,158 | B2* | 6/2014 | Morrill et al. ................. | 370/253 |
| 8,787,873 | B1* | 7/2014 | Hitt et al. ...................... | 455/406 |
| 2003/0083069 | A1* | 5/2003 | Vadgama ............. | H04W 36/22 455/436 |
| 2003/0186703 | A1* | 10/2003 | Cromer et al. ............... | 455/450 |
| 2003/0207686 | A1* | 11/2003 | Ramanna .......... | H04M 15/8214 455/435.1 |
| 2004/0072557 | A1* | 4/2004 | Paila et al. .................. | 455/414.1 |
| 2006/0092879 | A1* | 5/2006 | Jeong .................... | H04W 28/24 370/331 |
| 2009/0012885 | A1* | 1/2009 | Cahn ............................... | 705/34 |
| 2009/0111489 | A1* | 4/2009 | Wilson .......................... | 455/466 |
| 2011/0111729 | A1* | 5/2011 | Poltorak et al. .............. | 455/406 |
| 2011/0195698 | A1* | 8/2011 | Pearce .......................... | 455/418 |
| 2011/0244839 | A1* | 10/2011 | Poltorak .................... | 455/414.2 |
| 2012/0064908 | A1* | 3/2012 | Fox ....................... | H04W 28/10 455/452.2 |
| 2012/0096513 | A1* | 4/2012 | Raleigh et al. ................... | 726/1 |
| 2012/0115433 | A1* | 5/2012 | Young ................ | H04L 41/5029 455/406 |
| 2013/0023232 | A1* | 1/2013 | Mendiola ..................... | 455/406 |
| 2013/0237234 | A1* | 9/2013 | Jiao et al. ..................... | 455/444 |
| 2014/0155025 | A1* | 6/2014 | Parker et al. ................. | 455/406 |
| 2014/0179265 | A1* | 6/2014 | Bruns et al. ................. | 455/406 |
| 2014/0194093 | A1* | 7/2014 | Tsuda .................. | H04L 12/1485 455/408 |
| 2015/0011233 | A1* | 1/2015 | Kazmi et al. ................. | 455/454 |

FOREIGN PATENT DOCUMENTS

| WO | WO-2013031498 | 3/2013 |
|---|---|---|
| WO | WO-2014161086 | 10/2014 |

OTHER PUBLICATIONS

3rd Generation Partnership Project; Technical Specification Group Services and System Aspects; Study on Facilitating Machine to Machine Communication in 3GPP Systems; (Release 8), 3rd Generation Partnership Project, 3GPP TR 22.868 V8.0.0, Mar. 2007. 15 pages.
3GPP TS 23.401, "General Packet Radio Service (GPRS) enhancements for Evolved Universal Terrestrial Radio Access Network (E-UTRAN) access," Mar. 2013, V12.0.0. 290 pages.
3GPP TR 23.887, "Study on Machine-Type Communications (MTC) and other mobile data applications communications enhancements," Feb. 2013, V0.8.0.. 107 pages.
GPRS Tunnelling Protocol, retrieved from <en.wikipedia.org/wiki/GPRS_Tunnelling_Protocol> on Apr. 30, 2015. 7 pages.
GPP TSG RAN WG1 Meeting #72, R1-130824, St Julian's, Malta, Jan. 28-Feb. 1, 2013, Agenda Item: 7.3.4, Huawei, MediaTek, Text proposal for TR 36.888 on coverage improvement. 2 pages.
International Search Report and Written Opinion for International Patent Application No. PCT/CA2014/050328; dated Jun. 17, 2014; 8 pages.
Extended European Search Report for European Patent Application No. 14779240.2; dated Feb. 9, 2017; 10 pages.

* cited by examiner

METHOD AND SYSTEM FOR PROVIDING DIFFERENTIATED WIRELESS NETWORK ACCESS AND BILLING TO SUBSCRIBERS

CROSS-REFERENCE TO RELATED APPLICATIONS

This application claims the benefit and priority of U.S. Provisional Application 61/807,690, filed Apr. 2, 2013. The foregoing application is incorporated by reference herein in its entirety.

FIELD OF THE TECHNOLOGY

The present technology pertains in general to wireless networks such as LTE networks, and in particular to methods and systems for providing differentiated access and billing to subscribers based on modulation and coding schemes used.

BACKGROUND

Adaptive modulation and coding is used in wireless communication networks in order to match signal modulation and coding parameters to radio link conditions. For example, this can allow a poor quality radio channel to be used by adjusting communications to employ a suitably robust modulation and coding scheme, typically at the cost of a lower communication bit rate. Adaptive modulation and coding has been employed in high speed downlink packet access (HSDPA) networks, for example.

To date, adaptive modulation and coding operations in wireless networks have been implemented independently of billing and subscription control operations, with no mechanism to link the two. Therefore, even if more resources are used to transmit a message over a poor quality channel, subscribers are charged only based on the duration of a voice call or the amount of application-level data actually delivered by a data message. For example, the current Call Data Records (CDRs) are generated by core network nodes deeper in the system (such as the mobility management entity (MME), security gateway (SGW) or packet data network gateway (PGW)) which do not have access to information regarding the modulation and coding schemes being used by subscribers. Only the base transceiver station (BTS) has access to this information.

However, although such a pricing model is attractive in many cases, there are other cases where it may not be the most appropriate alternative. For example, a $3^{rd}$ Generation Partnership Project (3GPP) work item entitled "Updated SID on: Provision of low-cost MTC UEs based on LTE" (TSG RAN meeting #57, Chicago, USA, September, 2012, RP-121441), http://www.3gpp.org/ftp/tsg_ran/TSG_RAN/TSGR_57/Docs/RP-121441.zip) relates to a new study requiring a +20 dB improvement in coverage for LTE systems, which corresponds to what is referred to herein as an Ultra High Coverage Mode (UHCM). To attain this level of gain, UHCM would trade speed and latency off for coverage. In doing so the UHCM would likely use 100 times (i.e. 20 dB) the capacity relative to the current lowest modulation and coding scheme (MCS) used in LTE. Without a suitable means to recover costs for such resource-intensive operations, deployment of offerings such as UHCM may be jeopardized.

Therefore there is a need for methods and systems for providing differentiated access and billing to subscribers based on modulation and coding schemes used, that are not subject to one or more limitations of the prior art.

This background information is provided for the purpose of making known information believed by the applicant to be of possible relevance to the present technology. No admission is necessarily intended, nor should be construed, that any of the preceding information constitutes prior art against the present technology.

SUMMARY

An object of the present technology is to provide a method and system for providing differentiated wireless network access and billing to subscribers. In accordance with an aspect of the present technology, there is provided a method for providing access by a subscriber wireless device to a wireless network, the method comprising monitoring, by one or more infrastructure devices of the wireless network, for usage of a reserved service for communication between the subscriber wireless device and a base station of the wireless network; and adjusting, by a billing system associated with the wireless network, a monetary amount billed to an account associated with the subscriber wireless device based on usage of the reserved service.

In accordance with another aspect of the present technology, there is provided a wireless communication system configured for providing wireless network access to a subscriber wireless device, the system comprising an access monitoring module configured to monitor for usage of a reserved service for communication between the subscriber wireless device and a base station; and a billing module configured to adjust a monetary amount billed to an account associated with the subscriber wireless device based on said usage of the reserved service.

In accordance with another aspect of the present technology, there is provided a computer program product comprising a computer readable medium storing computer executable statements and instructions thereon that, when executed by a computer, perform operations for providing access by a subscriber wireless device to a wireless network, the operations comprising monitoring for usage of a reserved service for communication between the subscriber wireless device and a base station of the wireless network; and adjusting a monetary amount billed to an account associated with the subscriber wireless device based on said usage of the reserved service.

BRIEF DESCRIPTION OF THE FIGURES

These and other features of the technology will become more apparent in the following detailed description in which reference is made to the appended drawings.

DETAILED DESCRIPTION

Definitions

Figure 1:
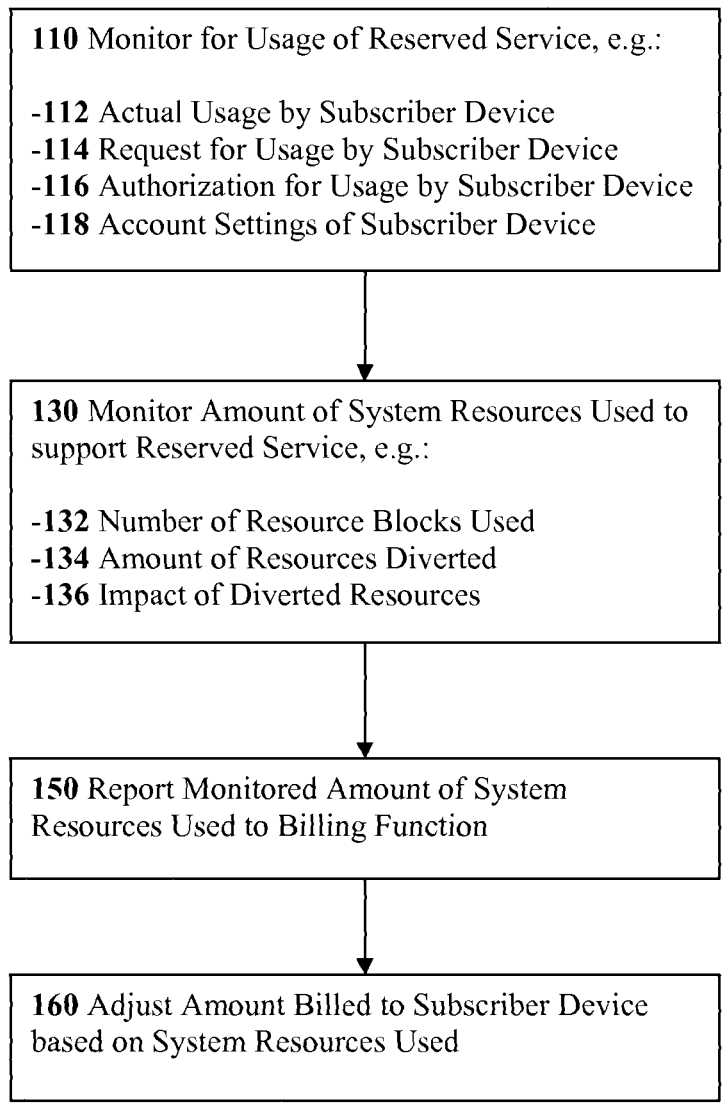
FIG. 1 illustrates a method for providing wireless network access to a subscriber device, in accordance with embodiments of the technology.

The term "wireless subscriber device" or "subscriber device" refers to a device such as a mobile cellphone, smartphone, personal digital assistant (PDA), machine-to-machine terminal, user equipment, or other device capable of wireless communication with a network such as a cellular network or Long Term Evolution (LTE) network or other wireless network as would be readily understood by a worker skilled in the art. The network generally requires client subscriber devices to be registered and associated with an account or subscription by which payment is made in exchange for wireless communication services.

As used herein, a machine-to-machine (M2M) terminal or user equipment refers to a wireless communication terminal linked to an automated device, such as a smart meter, environmental monitor, medical patient monitor, traffic monitoring and/or control device, or other automated equipment. M2M terminals are typically distinguished from human-to-human terminals, and are typically subjected to different communication demands. An M2M terminal may also be known as a machine-type-communication (MTC) terminal. An example study on M2M communications is presented in "3rd Generation Partnership Project; Technical Specification Group Services and System Aspects; Study on Facilitating Machine to Machine Communication in 3GPP Systems; (Release 8)," $3^{rd}$ Generation Partnership Project, 3GPP TR 22.868 V8.0.0, March, 2007.

As used herein, the term "about" refers to a +/−10% variation from the nominal value. It is to be understood that such a variation is always included in a given value provided herein, whether or not it is specifically referred to.

Unless defined otherwise, all technical and scientific terms used herein have the same meaning as commonly understood by one of ordinary skill in the art to which this technology belongs.

The present technology provides a method and system for monetizing the usage of a certain "reserved service," which comprises usage of certain reserved wireless operating modes, such as Ultra High Coverage Mode (UHCM), usage of one or more reserved Modulation and Coding Schemes (MCSs), or a combination thereof. In some embodiments the reserved MCSs may be employed solely when using the reserved operating mode. Similarly, the reserved operating mode may be defined at least in part by its usage of the reserved MCSs. In some embodiments, rather than or in addition to the reserved service providing higher coverage, the reserved service may provide another desirable feature, such as higher data rates, higher bandwidth, lower latency, higher noise tolerance, or the like, or a combination thereof.

Applicable monetization schemes in accordance with the present technology include subscription control, charging control, and a combination thereof. In subscription control, a wireless device is allowed to access a reserved operating mode and/or reserved MCSs upon authentication, once a subscription to the reserved service has been set up in an account for that wireless device. In charging control, a wireless device is allowed to access a reserved service, either with or without a subscription, but data usage is tracked and an account for the wireless device is billed for an amount of usage of the reserved service. In some embodiments, the amount of usage of the reserved service may correspond to the amount of application-level data actually delivered by a data message, but charged at a different rate (e.g. at a higher cost per kb) than standard non-reserved data services. In some embodiments, the amount of usage of the reserved service may correspond to the amount of network resources actually used to deliver a data message, rather than the actual amount of application-level data delivered by the data message.

Various embodiments of the present technology provide mobile network operators (MNOs) with the capability to charge a premium for usage of certain reserved services which consume a disproportionately large amount of network resources. For example, UHCM typically trades speed and latency for a large increase in coverage, but in doing so UHCM may use several times the network resources of standard operating modes. Such increases in network resources may be due to the more robust modulation and coding schemes that are required to communicate in very weak channel conditions, for example. The MNO sets the pricing policy for usage of reserved services based on various factors, such as its own infrastructure costs, the cost of lost service levels elsewhere, a desired amount of uptake in the marketplace, and an estimated cost that will be borne by the market and the like. The MNO may, for example, set prices high, relative to non-reserved services, such that only those subscribers who place high value on the reserved service will utilize it.

It is noted that, in current subscriber-based wireless networks, wireless subscriber devices closer to the base station use, on average, fewer radio access network (RAN) resources than devices further away, due to differences in channel conditions. However, MNOs currently do not charge more to access the base station from further away, since retail customers would typically not accept paying more for service simply due to poor coverage conditions in a certain area. However, certain customers, such as M2M customers (customers who deploy M2M devices and/or pay for device access to a wireless network), may greatly value access to reserved services such as UHCM. For example, UHCM may greatly extend network coverage so that even though a wireless device (such as a metering device) is deep in a basement where coverage would not normally be expected, wireless communication with the device may be possible using UHCM, although possibly only for very low data rates and long latencies. Furthermore, since many M2M devices are not required to communicate large amounts of data on a regular basis, the added cost for use of reserved services may be acceptably low for the M2M customers.

In accordance with an aspect of the technology, there is provided a method for providing access by a subscriber wireless device to a wireless network. The wireless network may be an LTE cellular network, for example, which grants access to wireless devices which are authenticated as holding a paid subscription to the network services. The method comprises monitoring for usage of a reserved service for communication between the subscriber device and a base station of the wireless network. The reserved service may be, for example, a service offering UHCM and/or a service offering premium usage of certain MCSs which provide for extended coverage in marginal signal conditions. The reserved service may be differentiated from a general service, such as a standard voice or data service, and may in various embodiments be described as a premium service. The method further comprises, upon a determination that the reserved service is being used for communication to and/or from the wireless device, monitoring an amount of system resources used to support communication using the reserved service. The amount of system resources used is contrasted from the amount of useful data, for example application-level data, communicated. For example, although the amount of resources used generally increases with the amount of useful data communicated, the average amount of resources used per unit of data communicated may change depending for example on channel conditions, wireless device location, distance to the base station, and the like. The method further comprises adjusting a monetary amount billed to an account associated with the subscriber wireless device based on the amount of system resources used. That is, the amount of resources used to convey the data is used as the basis of billing for paid services, rather than the amount of useful data conveyed.

FIG. 1 illustrates an embodiment of the above method. Monitoring 110 for usage of a reserved service may comprise monitoring for actual usage 112 of a reserved service (such as a reserved MCS) by the subscriber device, monitoring for a request 114 by the subscriber device for the base station to use a reserved service, monitoring for authorization 116 by the subscriber device to use a reserved service, or the like, or a combination thereof. Monitoring 110 may optionally comprise monitoring account settings 118 related to the subscriber device, for example specifying conditions under which the reserved service is authorized, usage limits, or the like. Monitoring 130 an amount of system resources used to support communication using the reserved service may comprise monitoring a number of resource blocks 132 used in conjunction with the subscriber device's usage of the reserved service, monitoring an amount of resources diverted 134 for providing the reserved service, monitoring an impact 136 of diverted resources on other subscriber devices, or the like, or a combination thereof. The values resulting from monitoring the amount of system resources used is reported 150, for example periodically, from a lower-level monitoring function to a higher-level billing function. Adjusting 160 a monetary amount billed to the subscriber device based on the amount of system resources used comprises modifying an account stored for example at a billing system, for example comprising a billing server, of the mobile network. The amount billed may be adjusted in increments for example based on the number of resource blocks used in relation to the reserved service. The amount billed per unit of resource may be constant, or it may increase or decrease with time.

Figure 2:
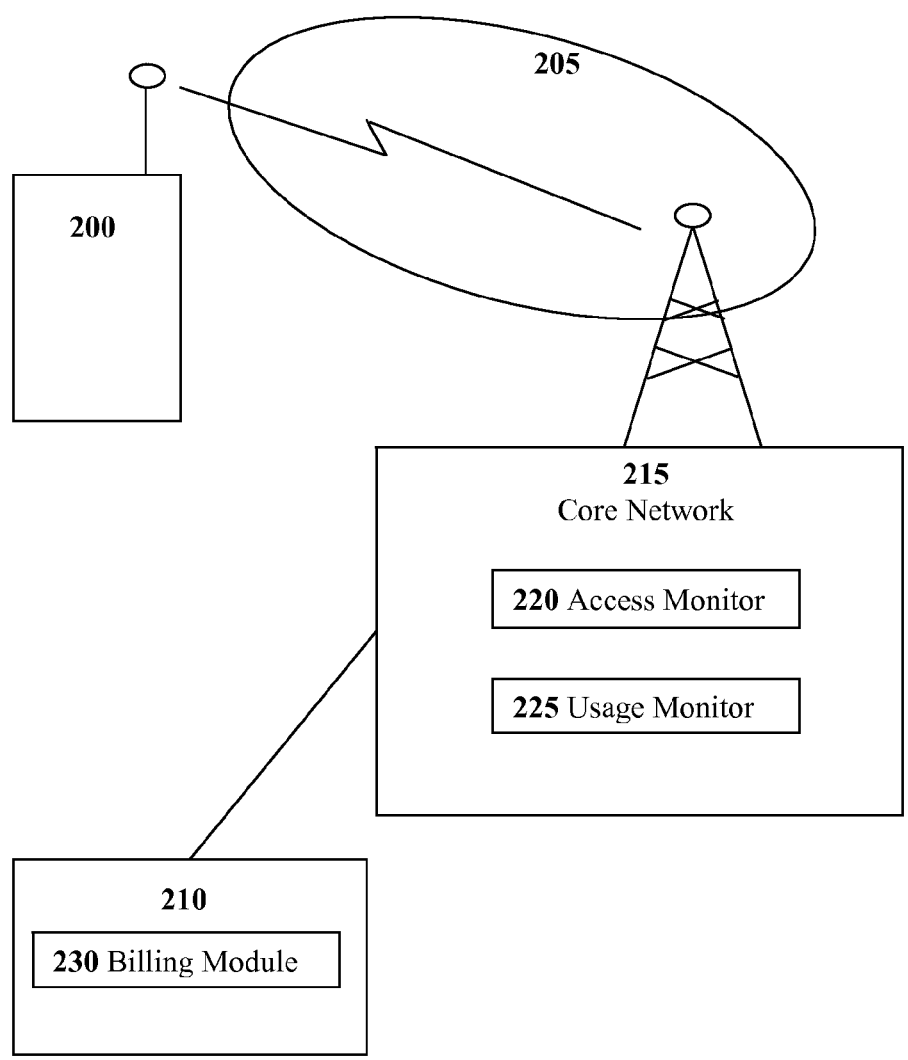
FIG. 2 illustrates a system for providing wireless network access to a subscriber device, in accordance with embodiments of the technology.

FIG. 2 illustrates a wireless communication system configured for providing wireless network access to a subscriber device 200, in accordance with an embodiment of the present technology. The wireless network comprises a Radio Access Network (RAN) 205 such as an e-UTRAN, as well as a Core Network 215 such as EPC (Evolved Packet Core) and a billing system 210. The Core Network comprises an access monitoring module 220 configured to monitor for usage of a reserved service for communication between the subscriber device and RAN. The Core Network also comprises a usage monitoring module 225, upon a determination that the reserved service is being used by the subscriber device, to monitor an amount of system resources used to support communication with the subscriber device via the reserved service. The system also comprises a billing module 230 located in the billing system 210 and configured to adjust a monetary amount billed to an account associated with the subscriber device based on the amount of system resources used. The billing system 210 may be part of the Core Network 215.

In some embodiments, the RAN 205 comprises an eNodeB, and the Core Network 215 is an EPC comprising such separate entities as a Serving Gateway, Packet Data Network Gateway, Mobility Management Entity, and Home Subscriber Server. In embodiments, different operations may be performed at different locations within the system. For example as access monitoring and/or usage monitoring may occur at a first location, while billing may occur at a different location.

Modulation and Coding Scheme

Various modulation and coding schemes (MCSs) may be employed in wireless communication systems such as LTE, as would be readily understood by a worker skilled in the art. A wireless device such as a M2M or handheld device may be capable of utilizing a variety of modulation and coding schemes to communicate data. Some modulation and coding schemes may be exclusively or non-exclusively used by a reserved service.

Different MCSs may differ in one or more of a variety of factors, for example including modulation type, number of spatial streams, coding rate, and the like. Spatial streams correspond to the number of different data streams achieved using multi-in-multi-out (MIMO) techniques. Modulation type refers to a method by which data is communicated. Examples of different modulation types corresponding to an MCS include binary phase shift keying (BPSK), quadrature phase shift keying (QPSK), 8-PSK, 16-quadrature amplitude modulation (QAM), 64-QAM, and the like. Coding rate refers to a proportion of the data stream which conveys usable data, as opposed to redundant information used for channel coding purposes. Example coding rates are ⅓, ½, ⅔, ⅘, and the like. Coding rates may be increased or decreased by puncturing or repetition, respectively, for example, as would be readily understood by a worker skilled in the art. A MCS may differ in other aspects, such as whether hybrid automatic repeat request (HARD) is enabled or disabled, which coding type (for example block codes, convolutional codes, or Turbo codes) is used, and the like.

In some embodiments, adaptive modulation and coding may be performed, for example in accordance with existing LTE protocols. This adaptive modulation and coding may be subject to restrictions related to reserved services such as UHCM, such that automatic adaptive usage of certain MCSs is subject to subscription control and/or charging control. For example, the lowest order modulation and/or lowest coding rates may be subject to additional charges.

As an example, adaptive modulation and coding may operate in an exclusive reserved service mode, a non-exclusive reserved service mode, or a non-reserved service mode. Selection of the appropriate mode may be performed by the wireless device, for example, possibly subject to subscription control authorization and/or user settings. In the exclusive reserved service mode, MCSs are selected adaptively from a set of MCSs which are exclusive to a reserved service. In the non-reserved service mode, MCSs are selected adaptively from a set of MCSs other than those MCSs which are exclusive to the reserved service. In the non-exclusive reserved mode, MCSs are selected adaptively from both sets of MCSs.

In some embodiments, increased coverage may be achieved by selection of an appropriate MCS having one or more of: a robust modulation type, for example a lower-order modulation type rather than a higher-order modulation type, a relatively low coding rate, and the like. In some embodiments, a low data rate is used with relaxed latency. For example, UHCM may allow for data size on the order of 100 bytes/message in the uplink and 20 bytes/message in the downlink, and an allowed latency of up to 10 seconds for downlink and up to 1 hour in uplink. Large data block sizes may be employed to leverage improved coding gains. Other methods may be used to increase coverage gains, for example, increasing block sizes, higher coding, more repetition (e.g. larger TTI bundling), power boosting (e.g. transmitting more power from eNB), power spectral density boosting (e.g. using narrower frequency transmission techniques), use of relaxed performance requirements (e.g.

allowing more time to decode some signals), increasing use of HARQ retransmission, increased segmentation (e.g. sending more and smaller packets), lowering of modulation order (e.g. increased use of low-order modulations such as BPSK), and the like.

It is noted that coverage increases can, in some wireless systems such as CDMA, be achieved by transmission power control. Embodiments of the present technology may further implement adaptive transmission power control in order to provide adequate coverage. Increases in transmission power by the base station may be monitored and additional charges may be levied for high transmission power in some embodiments. Increases in transmission power by the wireless device may be reported by the wireless device to the base station and additional charges may be levied. Charges may be justified on the observation that increased transmission power can lead to interference and degradation of service to other wireless terminals, for example. Charges may be related to an amount of additional system resources required to compensate for the increased transmission power or may be related to an amount of degradation of service experienced by other subscriber wireless devices within the system or both. For example, the amount of degradation of service can be used to determine an impact factor for determination of applicable charges for use of the reserved services for communication.

Subscription Control

In various embodiments, subscription control is employed as a means for monetizing the usage of reserved services, such as UHCM and MCSs employed substantially exclusively thereby. Subscription control allows the MNO to control which wireless devices are allowed to use the UHCM and which are not, by comparing an identifier obtained from the wireless device with stored subscription information. In this solution, the MNO may not necessarily perform further monitoring to determine whether the reserved services were actually used or an amount of network resources used in relation to the reserved services. Subscription control may be used to provide access to reserved services by both M2M devices and handheld mobile devices.

Figure 3:
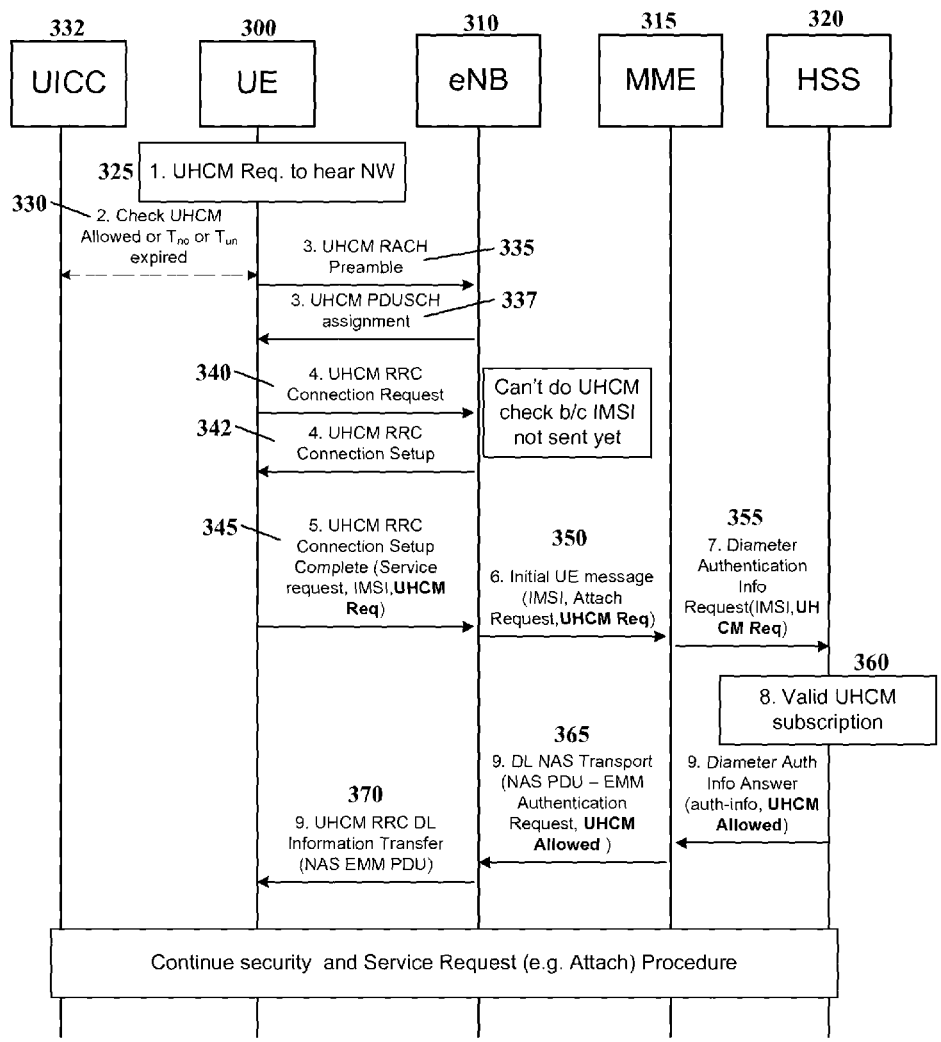
FIG. 3 illustrates a method for implementing subscription control in a wireless network, in accordance with embodiments of the technology.

FIG. 3 illustrates a method for implementing subscription control in a wireless network, particularly with respect to a reserved service such as UHCM which facilitates improved network coverage, in accordance with an embodiment of the present technology. The method is illustrated with respect to an LTE wireless network, although the instant technology may be applicable to other types of wireless networks. A Home Subscriber Server or Home Location Register (HSS/HLR) 320 holds the subscription information for various wireless devices, including whether or not the wireless device (or user equipment (UE)) 300 is permitted to use a reserved service such as UHCM. The wireless device 300 adds a reserved service request within the existing connection request procedure. Upon reception of the connection request, the HSS/HLR 320 transmits a response granting permission for use of the reserved service, said response being transmitted within the existing connection response procedures to the evolved NodeB (eNB) 310 (or similar base station equipment). Examples of existing connection request and response procedures would be readily apparent to a worker skilled in the art. If the wireless device 300 is currently not permitted to use the reserved services, the HSS/HLR 320 sends the wireless device 300 configuration information so that the wireless device 300 will not repeatedly request access to those reserved services (which could consume significant RAN resources).

In further detail, the illustrated method begins by determining 325 that the wireless device 300 can only communicate with the network if a reserved service such as UHCM is used, and initiating a request for such service. That is, it is determined that UHCM is required to hear the network. The wireless device then checks 330 with the universal integrated circuit card (UICC) 332 (or alternatively with an internally stored configuration) to determine if usage of the reserved mode is internally allowed, disallowed, or unknown (not configured). This is done to avoid a wireless device continuously requesting UHCM if it is not allowed. However, in some embodiments, the wireless device is nonetheless configured to check for subscription changes on an infrequent basis. Such subscription change checks may be performed by proceeding with the current procedure even if usage of the reserved mode is internally disallowed, but a subscription change timer has expired. In some embodiments, the UICC or wireless device may be configured with timers, wherein the following can define example time to wait periods.

$T_{no}$—time to wait when it is known the UHCM is not allowed, $T_{un}$—time to wait when it is unknown if UHCM is allowed.

In various embodiments, $T_{un}$ is substantially smaller than $T_{no}$. In various embodiments, parameters such as the above timer parameters may be configured Over the Air (OTA), for example via subscriber identity module-over the air (SIM OTA) or open mobile alliance-device management (OMA-DM), possibly only after a connection is made in adequate coverage.

Next, the wireless device 300 and eNB 310 perform physical layer random access procedures using the reserved service, for example using UHCM. For example, for current LTE implementations this comprises transmission of an uplink (UL) preamble 335 followed by an UL physical resource block (PRB) assignment 337 on the physical downlink control channel (PDCCH) for the physical uplink shared channel (PUSCH).

Next, the wireless device 300 and eNB 310 perform a Radio Resource Control (RRC) connection request 340 and setup 342 using reserved service physical layer procedures. At this point it is noted that, for existing connection request procedures, the wireless device subscriber identifier, for example the IMSI, typically hasn't been sent at this point. Therefore, a check for whether a subscription to the reserved service exists for the wireless device 300 cannot occur yet, as the subscription identifier is required to lookup the relevant subscription information access by the HSS/HLR 320.

Next, a Non-Access Stratum (NAS) layer connection request 345 is transmitted from the wireless device 300 to the eNB 310, including a request for the reserved service, e.g. via setting a UHCM request flag or using a specific predefined APN (access point name) associated with the reserved service. A wireless device subscription identifier (e.g. IMSI) is transmitted with the NAS request. The connection request is then sent 350 to the Mobility Management Entity (MME) 315 or alternatively to another entity such as a Serving general packet radio service (GPRS) Support Node (SGSN). Other requests such as Attach requests may also be sent along with or as part of the connection request. The connection request is then sent 355 to the HSS/HLR 320.

Next, the HSS/HLR 320 determines 360 if the wireless device 300 is currently associated with a valid subscription to the reserved service. This may involve a subscription database lookup operation indexed by the IMSI. If a valid subscription is not found, the HSS/HLR 320 returns a connection denied message (not shown) and possibly a set of parameters for retry control (for example $T_{no}$ and $T_{un}$ timer parameters). If a valid subscription is found, the HSS/HLR 320 responds by notifying the eNB 310 via the MME 315 that usage of the reserved service is allowed 365. The eNB 310 performs corresponding information transfer 370 to the wireless device 300. The reserved service status is carried forward to the wireless device, for example within existing security message flows.

Figure 4:
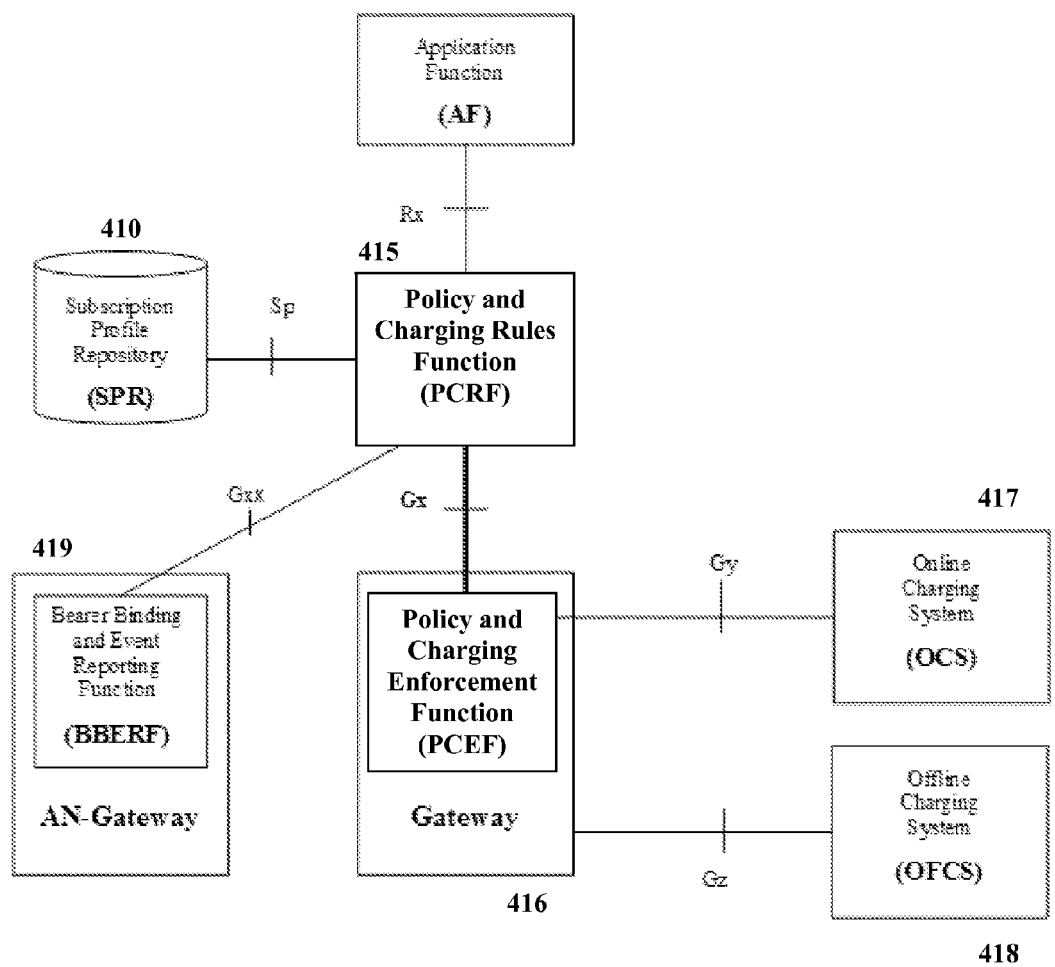
FIG. 4 illustrates a system for implementing subscription control in a wireless network, in accordance with embodiments of the technology.

FIG. 4 illustrates a system for implementing subscription control in a wireless network, particularly with respect to a reserved service such as UHCM according to embodiments of the present technology. The system provides a higher layer option, in which the Policy Control and Charging (PCC) system is extended to support subscription control for reserved service. The 3GPP PCC has become a standardized framework for providing Quality of Service (QoS) and Charging control for wireless devices. The PCC includes a Policy and Charging Rules Function (PCRF) 415 which provides policy control and flow based charging control decisions, and is coupled to a Policy and Charging Enforcement Function (PCEF) 416 which is implemented in the serving gateway and enforces gating and QoS for individual IP flows on the behalf of the PCRF and also provides usage measurement to support charging. The PCC also includes an Online Charging System (OCS) 417 which provides credit management and grants credit to the PCEF based on time, traffic volume or chargeable events. The PCC further includes an Offline Charging System (OFCS) 418 that can receive events from the PCEF and generate charging data records for the billing system. The illustrated PCEF is typically in the user plane and is typically co-located with the payment gateway (PGW) or general gateway support node (GGSN).

In some embodiments, the Subscription Profile Repository (SPR) 410 stores information regarding which wireless subscriber devices are authorized to use the reserved service, such as UHCM. A wireless device may then request a bearer supporting the reserved service, for example in accordance with a QoS bearer request. The bearer request, containing a new QoS parameter indicating UHCM, is sent to the Policy and Charging Rules Function (PCRF) 415 via the Bearer Binding and Event Reporting Function (BBERF) 419. The process subsequently proceeds similarly to other typical QoS requests, the difference being that the QoS request is specific to the reserved service. The PCRF checks with the SPR to determine if the requested QoS configuration is allowed for the wireless device's subscription. If so, the QoS bearer is setup. If not, the QoS bearer request is rejected by the PCRF. It is noted that significant network access may be required, for example to establish the LTE default bearer, before a QoS specific bearer is requested. In some embodiments, the wireless device is configured with a retry timer mechanism which inhibits excessive retries in quick succession, in order to avoid wasting system resources.

Charging Control

In various embodiments, charging control is employed as a means for monetizing the usage of reserved services, such as UHCM and MCSs employed substantially exclusively thereby. Charging control may be used independently or in conjunction with Subscription control. Charging control allows the MNO to track whether or not reserved services are used within a given period, and optionally how much the reserved service is used, for example as measured by an amount of data communicated via the reserved service and/or an amount of system resources used in communication of such data. Usage information may be provided to the MNO by obtaining an identifier of a wireless device, such as its IMSI, monitoring network activity associated with usage of the reserved service by the wireless device, and reporting said network activity along with the identifier to a charging or billing entity.

In some embodiments, monitoring usage of the reserved service comprises monitoring usage of MCSs associated with the reserved service. For example, each time a reserved MCS is used by the wireless device, the usage is reported, for example in a report that comprises: the details of the reserved MCS, an identifier of the wireless device, and an amount of data transferred or an amount of system resources used in said data transfer or both.

In various embodiments, information regarding usage of the reserved service, such as which modulation and coding schemes have been used by a wireless device, is passed from the eNB (or other base station) to relevant charging entities of the network, such as SGSN, SGW, PGW, and the like. In one embodiment, a header extension is added to packets transmitted via a tunneling protocol such as the GPRS tunneling protocol (GTP), or mobile IP. The eNB can include information regarding usage of the reserved service via the header extension, for example indicating which MCSs were used in communicating with a wireless device if a reserved operating mode such as UHCM was in use. In some embodiments, since the IP packet is typically much larger (e.g. 1600 bytes) than the physical layer protocol data unit (PDU) size, the header extension is made to be flexible enough for the eNB to communicate a variety of indications of which reserved resources were used and associated data sizes. Although GTP headers are backward compatible, for example if an entity does not understand an extension it ignores it, the charging entity can strip off the extension once received, in order to reduce the size of the GTP packet going forward.

As GTP was designed to allow for header extensions, creation of an appropriate GTP extension would be readily understood by a worker skilled in the art. The extension header flag bit (bit 5) is set in the GTP header. This is followed by at least one extension header having contents specifying usage of reserved services, for example which MCSs were used, an amount of data transferred, an amount of system resources used, and the like.

In some embodiments, rather than basing charging control solely on the basis of being a user of a reserved service and an amount of application-level data transferred, charging control may be based on the amount of system resources actually used in communication with a wireless device. For example, the amount of resources used typically depends on the MCSs used and the number of repetitions of a message (for example in accordance with HARQ). This may differ significantly from the amount of data actually delivered, since depending on the MCS used, more or fewer system resources may be used in the delivery of the same amount of data.

In some embodiments, even if a wireless device is associated with a subscription to a reserved service such as UHCM, it may use more or less system resources to communicate a given amount of payload data depending on how aggressive the reserved service is required to operate in order to communicate. For example, if a highly aggressive MCS is required with many repetitions, the amount of system resources may be higher than normal.

For example, in some embodiments, a standard rate may apply for use of certain MCSs, for example involving 64

QAM, while using other MCSs, such as involving 16 QAM (or BPSK, QPSK or 8-PSK) may cost more for the same delivered data. Costs may additionally or alternatively increase as the coding rate decreases. Different rates may be applied to different MCSs or groups of MCSs. In some embodiments, all MCSs are priced in this way, whether or not they are used in conjunction with a reserved service. In other embodiments, only certain MCSs, for example those associated with the reserved service, are priced in this way.

It is noted that different modulation orders and/or different coding rates will tend to use different amounts of system resources for transferring the same amount of application-level data. For example, a lower modulation order may utilize more resources up front, since lower modulation orders transmit fewer bits per symbol than higher modulation orders. Similarly, a lower coding rate may utilize more resources up front, since higher numbers of symbols are used to convey the same amount of data. However, for certain channel conditions, a lower modulation order and/or a lower coding rate may actually utilize fewer resources overall, since repetition of messages, errors due to signal loss, and the like, are guarded against. Therefore, for a given set of channel conditions, there typically exists at least one "most efficient" MCS. Adaptive modulation and coding (AMC), responsive to channel quality measurements, can be applied in order to implement a relatively efficient MCS.

However, although AMC, on its own, can result in an efficient use of resources for a given situation, the network operator is not compensated for providing service in marginal radio conditions (for example communication with a terminal located in a basement), in which even the most efficient MCS still consumes more resources than would be consumed under non-marginal radio conditions. Furthermore, as long as such a marginally placed wireless device operates acceptably well, the wireless device operator is not provided with an incentive to place the device in a better location. Charging control as described herein may be employed to alleviate these disadvantages.

As another example, costs may additionally or alternatively increase with the number of resources used in repeating a message. This may be inherent to charging based on resource usage.

As another example, costs may be based on the number of physical resource blocks used for communication in an LTE system. Using more physical resource blocks may correspond to an increased cost.

In various embodiments, resource usage may correspond to resources used by an eNB or other base station for transmission, resources used by the eNB or base station for reception, or a combination thereof. In some embodiments, resource usage may further correspond to time delays (time resources) or other impositions experienced by other wireless devices due to resource usage by a first wireless device. For example, if the first wireless device's use of resources causes bandwidth scarcity, this may be taken into account for charging control. For example, an impact factor can be determined based on the realized impact on services by other wireless devices due to the first wireless device's use of reserved resources.

In one embodiment, the most expensive MCS may correspond to the most extreme coverage extension, which corresponds to use of UHCM at the 20 dB target of coverage extension sought for future UHCM schemes.

In some embodiments, increased cost may be associated with certain patterns of resource usage, rather than or in addition to an amount of resources used. For example, if communication with a wireless device utilizes a large contiguous block of LTE physical resource blocks in time and/or frequency (relative to standard operating modes), then an extra charge may be levied for providing this service.

In some embodiments, differential pricing as discussed above may not be used for connections which are not associated with the reserved service, for handheld mobile devices, or a combination thereof. This configuration can preserve the traditional pricing model for existing customers.

In some embodiments, service pricing offered to a subscriber may relate to a group of M2M wireless terminals and may be based on an average of resource usage by a number of the terminals owned or operated by the one subscriber, such as a utility provider, alarm company or other supplier of M2M wireless services. Such a scheme may include offers of a price for a level of service represented by limited UHCM modes only up to a predetermined level of coverage beyond normal coverage modes. In some embodiments, service may be throttled or limited at a maximum throughput or number of accessing terminals during a time interval or at certain times of day. Service may be limited to a lower priority and connections temporarily throttled or denied when the overall traffic is high. A provision for priority override may be offered to overcome these restrictions for urgent needs optionally at a premium price.

In addition, if communication to and/or from a device requires a high number of retries (for example as requested by an HARQ scheme), then a disproportionately large amount of system resources will be required for communication of a given amount of data to and/or from this device. This use of a disproportionately large amount of system resources may even occur for robust (e.g. low modulation orders and/or low coding rates) MCSs.

In some embodiments, subscribers to a service priced on the basis of actual resources used may not be shown all of the details of the amount of each non-reserved MCS or reserved MCS used but rather a total usage calculated as the sum of usage over all modes within a billing period. In other embodiments, an option is provided to view summaries of resource usage and charges by MCS, reserved mode, reserved service, or a combination thereof.

It is noted that comparing cost with data transferred using this modified billing mechanism may make it clear which UEs are in poor coverage areas and this information may prompt their owners to install external antennas or re-locate the UEs, if possible, to improve their link budget and therefore reduce operating costs. In some embodiments, this system may enable monitoring of changes in cost which might be indicative of a hardware failure such as a broken antenna, shielding or obstruction of the propagation path or the like or a combination thereof.

It will be appreciated that, although specific embodiments of the technology have been described herein for purposes of illustration, various modifications may be made without departing from the spirit and scope of the technology. In particular, it is within the scope of the technology to provide a computer program product or program element, or a program storage or memory device such as a magnetic or optical wire, tape or disc, or the like, for storing signals readable by a machine, for controlling the operation of a computer according to the method of the technology and/or to structure some or all of its components in accordance with the system of the technology.

Acts associated with the method described herein can be implemented as coded instructions in a computer program product. In other words, the computer program product is a computer-readable medium upon which software code is recorded to execute the method when the computer program product is loaded into memory and executed on the microprocessor of the wireless communication device.

Acts associated with the method described herein can be implemented as coded instructions in plural computer program products. For example, a first portion of the method may be performed using one computing device, and a second portion of the method may be performed using another computing device, server, or the like. In this case, each computer program product is a computer-readable medium upon which software code is recorded to execute appropriate portions of the method when a computer program product is loaded into memory and executed on the microprocessor of a computing device.

Further, each step of the method may be executed on any computing device, such as a personal computer, server, PDA, or the like and pursuant to one or more, or a part of one or more, program elements, modules or objects generated from any programming language, such as C++, Java, PL/1, or the like. In addition, each step, or a file or object or the like implementing each said step, may be executed by special purpose hardware or a circuit module designed for that purpose.

It is obvious that the foregoing embodiments of the technology are examples and can be varied in many ways. Such present or future variations are not to be regarded as a departure from the spirit and scope of the technology, and all such modifications as would be obvious to one skilled in the art are intended to be included within the scope of the following claims.

We claim:

1. A method for providing access by a subscriber wireless device to a wireless network, the method comprising:
monitoring, by a Core Network of the wireless network, for usage of a reserved service for communication between the subscriber wireless device and a base station of the wireless network, wherein the reserved service provides coverage to the subscriber wireless device in signal conditions for which the subscriber wireless device does not otherwise receive coverage;
allowing usage of the reserved service only upon confirming that the subscriber wireless device is authorized to use the reserved service, wherein the reserved service is different from a general wireless communication service by which the subscriber wireless device can communicate with the base station when signal conditions allow; and
adjusting, by a billing system communicatively connected with the Core Network, a monetary amount billed to an account associated with the subscriber wireless device based on usage of the reserved service,
wherein the subscriber wireless device is configured to operate in one of a number of operating modes including: an operating mode in which the subscriber wireless device only selects services from a set of reserved services, an operating mode in which the subscriber wireless device only selects services not in the set of reserved services, and an operating mode in which the subscriber wireless device selects services within and outside of the set of reserved services, wherein the reserved service belongs to the set of reserved services.

2. The method according to claim 1, further comprising: upon a determination that the reserved service is being used, monitoring, by said one or more infrastructure devices of the wireless network, a usage of system resources to support the communication using the reserved service; and wherein the monetary amount billed is adjusted based on the usage of system resources.

3. The method according to claim 2, wherein the usage of system resources corresponds to one or more of: an amount of system resources used, a modulation and coding scheme used, a modulation order used, a coding rate used, a number of spatial streams used, a number of message repetitions, a number of Physical Resource Blocks used, and a size of a contiguous block of Physical Resource Blocks used.

4. The method according to claim 3, wherein the amount of system resources corresponds to an amount of physical resource blocks of an LTE system.

5. The method according to claim 2, wherein the monetary amount billed per unit of application level data transmitted via the reserved service is greater than a monetary amount billed per unit of application level data transmitted via a non-reserved service.

6. The method according to claim 1, further comprising: upon a determination that the reserved service is being used, monitoring, by said one or more infrastructure devices of the wireless network, an amount of useful data delivered to the subscriber wireless device via use of the reserved service; wherein the monetary amount billed is adjusted based on the amount of useful data delivered.

7. The method according to claim 1, wherein the reserved service corresponds at least in part to usage of one or more modulation and coding schemes which are employed solely for use according to the reserved service, said one or more modulation and coding schemes usable for providing communication coverage in weak channel conditions.

8. The method according to claim 1, further comprising blocking usage of the reserved service upon determining that the subscriber wireless device is unauthorized to use the reserved service.

9. The method according to claim 1, wherein confirming that the subscriber wireless device is authorized to use the reserved service comprises the subscriber wireless device checking an internal register thereof, the internal register reflective of a local subscription state of the subscriber wireless device which is periodically updated to reflect a corresponding remote subscription state stored on a remote server.

10. The method according to claim 1, wherein the reserved service is an Ultra High Coverage Mode configured for providing wireless communication system coverage to the subscriber wireless device when situated at or near a marginal coverage area of the wireless communication system, wherein the Ultra High Coverage Mode is employed solely when using the reserved service.

11. A wireless communication system configured for providing wireless network access to a subscriber wireless device, the system comprising:
a Core Network of the wireless network, the core network having an access monitoring module configured to monitor for usage of a reserved service for communication between the subscriber wireless device and a base station, wherein the reserved service provides coverage to the subscriber wireless device in signal conditions for which the subscriber wireless device does not otherwise receive coverage; and
a billing module communicatively connected to the Core Network, the billing module configured to adjust a monetary amount billed to an account associated with the subscriber wireless device based on said usage of the reserved service;

wherein the system is further configured to allow usage of the reserved service only upon confirming that the subscriber wireless device is authorized to use the reserved service, wherein the reserved service is different from a general wireless communication service by which the subscriber wireless device can communicate with the base station when signal conditions allow; and wherein the subscriber wireless device is configured to operate in one of a number of operating modes including: an operating mode in which the subscriber wireless device only selects services from a set of reserved services, an operating mode in which the subscriber wireless device only selects services not in the set of reserved services, and an operating mode in which the subscriber wireless device selects services within and outside of the set of reserved services, wherein the reserved service belongs to the set of reserved services.

12. The wireless communication system according to claim 11, further comprising: a usage monitoring module configured, upon a determination that the reserved service is being used by the subscriber wireless device, to monitor an amount of system resources used to support communication with the subscriber wireless device via the reserved service; and wherein the billing module is configured to adjust the monetary amount based on the amount of system resources used.

13. The wireless communication system according to claim 12, wherein the usage of system resources corresponds to one or more of: an amount of system resources used, a modulation and coding scheme used, a modulation order used, a coding rate used, a number of spatial streams used, a number of message repetitions, a number of Physical Resource Blocks used, and a size of a contiguous block of Physical Resource Blocks used.

14. The wireless communication system according to claim 11, further comprising: a usage monitoring module configured, upon a determination that the reserved service is being used by the subscriber wireless device, to monitor an amount of useful data delivered to the subscriber wireless device via use of the reserved service; and wherein the billing module is configured to adjust the monetary amount based on the amount useful data delivered.

15. The wireless communication system according to claim 1, wherein confirming that the subscriber wireless device is authorized to use the reserved service comprises the subscriber wireless device checking an internal register thereof, the internal register reflective of a local subscription state of the subscriber wireless device which is periodically updated to reflect a corresponding remote subscription state stored on a remote server.

16. The wireless communication system according to claim 1, wherein confirming that the subscriber wireless device is authorized to use the reserved service comprises checking a Home Subscriber Server/Home Location Register (HSS/HLR) for authorization information.

17. The wireless communication system according to claim 11, wherein the reserved service corresponds at least in part to usage of one or more modulation and coding schemes which are employed solely for use according to the reserved service, said one or more modulation and coding schemes usable for providing communication coverage in weak channel conditions.

18. The wireless communication system according to claim 11, wherein the reserved service is an Ultra High Coverage Mode configured for providing wireless communication system coverage to the subscriber wireless device when situated at or near a marginal coverage area of the wireless communication system, wherein the Ultra High Coverage Mode is employed solely when using the reserved service.

19. A method for providing access by a subscriber wireless device to a wireless network, the method comprising:
monitoring, by a Core Network of the wireless network, for usage of a reserved service for communication between the subscriber wireless device and a base station of the wireless network, wherein the reserved service provides coverage to the subscriber wireless device in signal conditions for which the subscriber wireless device does not otherwise receive coverage;
allowing usage of the reserved service only upon confirming that the subscriber wireless device is authorized to use the reserved service, wherein the reserved service is different from a general wireless communication service by which the subscriber wireless device can communicate with the base station when signal conditions allow;
adjusting, by a billing system communicatively connected with the Core Network, a monetary amount billed to an account associated with the subscriber wireless device based on usage of the reserved service; and
upon a determination that the reserved service is being used, determining, by said one or more infrastructure devices of the wireless network, an impact factor based on a degradation of service to other subscriber wireless devices due to use of the reserved service by the subscriber wireless device; wherein the monetary amount billed is adjusted based on the impact factor.

20. The method according to claim 19, wherein the impact corresponds to one or more of: a time delay experienced by said other subscriber wireless devices; and interference with said other subscriber wireless devices caused by increased transmission power of the subscriber wireless device.

21. A wireless communication system configured for providing wireless network access to a subscriber wireless device, the system comprising:
a Core Network of the wireless network, the core network having an access monitoring module configured to monitor for usage of a reserved service for communication between the subscriber wireless device and a base station, wherein the reserved service provides coverage to the subscriber wireless device in signal conditions for which the subscriber wireless device does not otherwise receive coverage; and
a billing module communicatively connected to the Core Network, the billing module configured to adjust a monetary amount billed to an account associated with the subscriber wireless device based on said usage of the reserved service;
wherein the system is further configured to allow usage of the reserved service only upon confirming that the subscriber wireless device is authorized to use the reserved service, wherein the reserved service is different from a general wireless communication service by which the subscriber wireless device can communicate with the base station when signal conditions allow; and
a usage monitoring module configured, upon a determination that the reserved service is being used by the subscriber wireless device, to determine an impact factor based on a degradation of service to other subscriber wireless devices due to use of the reserved service by the subscriber wireless device; and wherein the billing module is configured to adjust the monetary amount based on the impact factor.

22. A wireless communication system configured for providing wireless network access to a subscriber wireless device, the system comprising:

a Core Network of the wireless network, the core network having an access monitoring module configured to monitor for usage of a reserved service for communication between the subscriber wireless device and a base station, wherein the reserved service provides coverage to the subscriber wireless device in signal conditions for which the subscriber wireless device does not otherwise receive coverage; and a billing module communicatively connected to the Core Network, the billing module configured to adjust a monetary amount billed to an account associated with the subscriber wireless device based on said usage of the reserved service;

wherein the system is further configured to allow usage of the reserved service only upon confirming that the subscriber wireless device is authorized to use the reserved service, wherein the reserved service is different from a general wireless communication service by which the subscriber wireless device can communicate with the base station when signal conditions allow;

wherein confirming that the subscriber wireless device is authorized to use the reserved service comprises the subscriber wireless device checking an internal register thereof, the internal register reflective of a local subscription state of the subscriber wireless device which is periodically updated to reflect a corresponding remote subscription state stored on a remote server; and wherein the remote server is configured to update the local subscription state of the subscriber wireless device, said local subscription state comprising a first time interval to wait between subscription change checks for use of the reserved service when it is known to the subscriber wireless device that usage of the reserved service is not allowed and a second time interval to wait between subscription change checks for use of the reserved service when usage of the reserved service is unknown to the subscriber wireless device.

23. A computer program product comprising a non-transitory computer readable medium storing computer executable statements and instructions thereon that, when executed by a computer, perform operations for providing access by a subscriber wireless device to a wireless network, the operations comprising:

monitoring for usage of a reserved service for communication between the subscriber wireless device and a base station of the wireless network, wherein the reserved service provides coverage to the subscriber wireless device in signal conditions for which the subscriber wireless device does not otherwise receive coverage;

allowing usage of the reserved service only upon confirming that the subscriber wireless device is authorized to use the reserved service, wherein the reserved service is different from a general wireless communication service by which the subscriber wireless device can communicate with the base station when signal conditions allow; and adjusting a monetary amount billed to an account associated with the subscriber wireless device based on usage of the reserved service;

wherein the subscriber wireless device is configured to operate in one of a number of operating modes including: an operating mode in which the subscriber wireless device only selects services from a set of reserved services, an operating mode in which the subscriber wireless device only selects services not in the set of reserved services, and an operating mode in which the subscriber wireless device selects services within and outside of the set of reserved services, wherein the reserved service belongs to the set of reserved services.

* * * * *

UNITED STATES PATENT AND TRADEMARK OFFICE
CERTIFICATE OF CORRECTION

PATENT NO. : 9,948,789 B2
APPLICATION NO. : 14/243604
DATED : April 17, 2018
INVENTOR(S) : Gustav Vos, Richard Thomas Kavanaugh and Steven John Bennett Page 1 of 1

It is certified that error appears in the above-identified patent and that said Letters Patent is hereby corrected as shown below:

In the Specification

In Column 6, Line 27, delete "(HARD)" and insert -- (HARQ) --, therefor.

Signed and Sealed this
Third Day of July, 2018

Andrei Iancu
*Director of the United States Patent and Trademark Office*